(12) United States Patent
Martin et al.

(10) Patent No.: US 6,563,487 B2
(45) Date of Patent: May 13, 2003

(54) HAPTIC FEEDBACK FOR DIRECTIONAL CONTROL PADS

(75) Inventors: Kenneth M. Martin, Palo Alto, CA (US); Louis B. Rosenberg, San Jose, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 09/467,309

(22) Filed: Dec. 17, 1999

(65) Prior Publication Data

US 2003/0030619 A1 Feb. 13, 2003

Related U.S. Application Data

(63) Continuation-in-part of application No. 09/253,132, filed on Feb. 18, 1999, now Pat. No. 6,243,078, which is a continuation-in-part of application No. 09/156,802, filed on Sep. 17, 1998, now Pat. No. 6,184,868, which is a continuation-in-part of application No. 09/103,281, filed on Jun. 23, 1998, now Pat. No. 6,088,019.

(51) Int. Cl.[7] ................................................ G09G 5/00

(52) U.S. Cl. ..................................................... 345/156

(58) Field of Search ................................ 345/156, 161, 345/168, 169; 463/37, 38

(56) References Cited

U.S. PATENT DOCUMENTS

| | | | | |
|---|---|---|---|---|
| 5,896,125 A | * | 4/1999 | Niedzwiecki | 345/168 |
| 5,903,257 A | * | 5/1999 | Nishiumi et al. | 345/157 |
| 5,984,785 A | * | 11/1999 | Takeda et al. | 463/38 |
| 6,102,803 A | * | 8/2000 | Takeda et al. | 463/38 |
| 6,225,976 B1 | * | 5/2001 | Yates et al. | 345/156 |

OTHER PUBLICATIONS

Baigrie, "Electric Control Loading –A Low Cost, High Performance Alternative," Proceedings, pp. 247–254, Nov. 6–8, 1990.

Iwata, "Pen–based Haptic Virtual Environment," 0–7803–1363–1/93 IEEE, pp. 287–292, 1993.

Russo, "The Design and Implementation of a Three Degree of Freedom Force Output Joystick," MIT Libraries Archives Aug. 14, 1990, pp. 1–131, May 1990.

Brooks et al., "Hand Controllers for Teleoperation –A State–of–the–Art Technology Survey and Evaluation," JPL Publication 85–11; NASA–CR–175890; N85–28559, pp. 1–84, Mar. 1, 1985.

Jones et al., "A perceptual analysis of stiffness," ISSN 0014–4819 Springer International (Springer–Verlag); Experimental Brain Research, vol. 79, No. 1, pp. 150–156, 1990.

(List continued on next page.)

*Primary Examiner*—Richard Hjerpe
*Assistant Examiner*—Ronald Laneau
(74) *Attorney, Agent, or Firm*—Kilpatrick Stockton LLP (57) ABSTRACT

A haptic feedback control device coupled to a host computer and outputting forces to a user of the control device. The control device includes a housing, a direction pad capable of being contacted by the user in at least two different locations to provide two different directional signals to the host computer, and a computer-controlled actuator that outputs a force directly on the direction pad. A sensor, such as one or more contact switches, can detects when the locations of the direction pad have been contacted or pressed by the user. The actuator can be a linear or rotary actuator that outputs a force on the direction pad, e.g. approximately perpendicular to the top surface of the direction pad. The actuator can output a vibration or a pulse tactile sensation on the direction pad in coordination with interactions or events in a computer graphical environment or functions of a controlled electronic device. The control device can be a game controller, a mouse, a remote control device, or other type of device.

60 Claims, 6 Drawing Sheets

OTHER PUBLICATIONS

Burdea et al., "Distributed Virtual Force Feedback, Lecture Notes for Workshop on Force Display in Virtual Environments and its Application to Robotic Teleoperation," 1993 IEEE International Conference on Robotics and Automation, pp. 25–44, May 2, 1993.

Snow et al., "Model–X Force–Reflecting–Hand–Controller," NT Control No. MPO–17851; JPL Case No. 5348, pp. 1–4, Jun. 15, 1989.

Ouh–Young, "Force Display in Molecular Docking," Order No. 9034744, pp. 1–369, 1990.

Tadros, Control System Design for a Three Degrees of Freedom Virtual Environment Simulator Using Motor/Brake Pair Actuators, MIT Archive © Massachusetts Institute of Technology, pp. 1–88, Feb. 1990.

Caldwell et al., "Enhanced Tactile Feedback (Tele–Taction) Using a Multi–Functional Sensory System," 1050–4729/93, pp. 955–960, 1993.

Adelstein, "Design and Implementation of a Force Reflecting Manipulandum for Manual Control research," DSC–vol. 42, Advances in Robotics, Edited by H. Kazerooni, pp. 1–12, 1992.

Gotow et al., "Controlled Impedance Test Apparatus for Studying Human Interpretation of Kinesthetic Feedback," WA11–11:00, pp. 332–337.

Stanley et al., "Computer Simulation of Interacting Dynamic Mechanical Systems Using Distributed Memory Parallel Processors," DSC–vol. 42, Advances in Robotics, pp. 55–61, ASME 1992.

Russo, "Controlling Dissipative Magnetic Particle Brakes in Force Reflective Devices," DSC–vol. 42, Advances in Robotics, pp. 63–70, ASME 1992.

Kontarinis et al., "Display of High–Frequency Tactile Information to Teleoperators," Telemanipulator Technology and Space Telerobotics, Won S. Kim, Editor, Proc. SPIE vol. 2057, pp. 40–50, Sep. 7–9, 1993.

Patrick et al., "Design and Testing of A Non–reactive, Fingertip, Tactile Display for Interaction with Remote Environments," Cooperative Intelligent Robotics in Space, Rui J. deFigueiredo et al., Editor, Proc. SPIE vol. 1387, pp. 215–222, 1990.

Adelstein, "A Virtual Environment System for the Study of Human Arm Tremor," Ph.D. Dissertation, Dept. of Mechanical Engineering, MIT, Jun. 1989.

Bejczy, "Sensors, Controls, and Man–Machine Interface for Advanced Teleoperation," Science, vol. 208, No. 4450, pp. 1327–1335, 1980.

Bejczy, "Generalization of Bilateral Force–Reflecting Control of Manipulators," Proceedings of Fourth CISM–IFToMM, Sep. 8–12, 1981.

McAffee, "Teleoperator Subsystem/Telerobot Demonsdtrator: Force Reflecting Hand Controller Equipment Manual," JPL D–5172, pp. 1–50, A1–A36, B1–B5, C1–C36, Jan. 1988.

Minsky, "Computational Haptics: The Sandpaper System for Synthesizing Texture for a Force–Feedback Display," Ph.D. Dissertation, MIT, Jun. 1995.

Jacobsen et al., "High Performance, Dextrous Telerobotic Manipulator With Force Reflection," Intervention/ROV '91 Conference & Exposition, Hollywood, Florida, May 21–23, 1991.

Shimoga, "Finger Force and Touch Feedback Issues in Dexterous Telemanipulation," Proceedings of Fourth Annual Conference on Intelligent Robotic Systems for Space Expploration, Rensselaer Polytechnic Institute, Sep. 30–Oct. 1, 1992.

IBM Technical Disclosure Bullein, "Mouse Ball–Actuating Device With Force and Tactile Feedback," vol. 32, No. 9B, Feb. 1990.

Terry et al., "Tactile Feedback in a Computer Mouse, " Proceedings of Fouteenth Annual Northeast Bioengineering Conference, University of New Hampshire, Mar. 10–11, 1988.

Howe, "A Force–Reflecting Teleoperated Hand System for the Study of Tactile Sensing in Precision Manipulation," Proceedings of the 1992 IEEE International Conference on Robotics and Automation, Nice, France, May 1992.

Eberhardt et al., "Omar –A Haptic display for speech perception by deaf and deaf–blind individuals,"IEEE Virtual Reality Annual International Symposium, Seattle, WA, Sep. 18–22, 1993.

Rabinowitz et al., "Multidimensional tactile displays: Identification of vibratory intensity, frequency, and contactor area," Journal of the Acoustical Society of America, vol. 82, No. 4, Oct. 1987.

Bejczy et al., "Kinesthetic Coupling Between Operator and Remote Manipulator," International Computer Technology Conference, The American Society of Mechanical Engineers, San Francisco, CA, Aug. 12–15, 1980.

Bejczy et al., "A Laboratory Breadboard System for Dual–Arm Teleoperation,"SOAR '89 Workshop, JSC, Houston, TX, Jul. 25–27, 1989.

Ouh–Young, "A Low–Cost Force Feedback Joystick and Its Use in PC Video Games," IEEE Transactions on Consumer Electronics, vol. 41, No. 3, Aug. 1995.

Marcus, "Touch Feedback in Surgery," Proceedings of Virtual Reality and Medicine The Cutting Edge, Sep. 8–11, 1994.

Bejczy, et al., "Universal Computer Control System (UCCS) for Space Telerobots," CH2413–3/87/0000/0318501.00 1987 IEEE, 1987.

Patrick, "Design, Construction, and Testing of a Fingetip Tactile Display for Interaction with Virtual and Remote Environments," Master of Science Thesis, MIT, Nov. 8, 1990.

Cadler, "Design of A Force–Feedback Touch–Introducing Actuator for Teleoperator Robot Control," Bachelor of Science Thesis, MIT, Jun. 23, 1983.

Wiker, "Teletouch Display Development: Phase 1 Report," Technical Report 1230, Naval Ocean Systems Center, San Diego, Apr. 17, 1989.

Bliss, "Optical–to–Tactile Image Conversion for the Blind," IEEE Transactions on Man–Machine Systems, vol. MMS–11, No. 1, Mar. 1970.

Johnson, "Shape–Memory Alloy Tactile Feedback Actuator," Armstrong Aerospace Medical Research Laboratory, AAMRL–TR–90–039, Aug., 1990.

* cited by examiner

HAPTIC FEEDBACK FOR DIRECTIONAL CONTROL PADS

CROSS REFERENCE TO RELATED APPLICATIONS

This application is a continuation-in-part of parent patent applications:

Application Ser. No. 09/156,802, now U.S. Pat. No. 6,184,868, filed Sep. 17, 1998 entitled, "Haptic Feedback Control Devices,"

Application Ser. No. 09/103,281, now U.S. Pat. No. 6,088,019, filed Jun. 23, 1998 entitled, "Low Cost Force Feedback Device with Actuator for Non-Primary Axis," and Application Ser. No. 09/253,132, now U.S. Pat. No. 6,243,078, filed Feb. 18, 1999 on behalf of Louis Rosenberg, entitled, "Pointing Device with Forced Feedback Button,"

all assigned to the assignee of this present application, and all of which are incorporated herein by reference in their entirety.

BACKGROUND OF THE INVENTION

The present invention relates generally to the interfacing with computer and mechanical devices by a user, and more particularly to devices used to interface with computer systems and electronic devices and which provide haptic feedback to the user.

Humans interface with electronic and mechanical devices in a variety of applications, and the need for a more natural, easy-to-use, and informative interface is a constant concern. In the context of the present invention, humans interface with computer devices for a variety of applications. One such application is interacting with computer-generated environments such as games, simulations, and application programs. Computer devices such as game consoles (e.g. available from Nintendo, Sony, and Sega), personal computers, portable computers, and internet appliances are typically used to provided these environments, although a wide variety of devices can be used.

For many computer generated environments, users interface with the environment using an interface device having controls such as a joystick, gamepad, mouse, trackball, buttons, steering wheel, or other device physically contacted and manipulated by the user. The user manipulates the controls which provides position or other related input data to the computer, and the computer updates the environment or program in response, such as a game program.

In some interface devices, force feedback or tactile feedback is also provided to the user, more generally known herein as "haptic feedback." In the game console market, haptic feedback interface devices such as "gamepad" controllers (or add-on hardware for gamepad controllers) for game consoles include the Dual Shock from Sony, the Rumble Pack from Nintendo, and the Jump Pack from Sega. These devices are vibrotactile-feedback controllers which employ one or more motors coupled to the housing of the controller to shake the housing and thus provide output vibrations to the user which are correlated to game events and interactions. Typically, an eccentric rotating mass (ERM) motor is used to generate vibration on the controller housing and thus to the user.

One problem with existing vibrotactile controllers is that the vibrations produced are generalized in location to the entire housing of the control device. Thus the user cannot experience localized tactile sensations that are specific to a portion of the gamepad controller or to a control on the controller, such as a button or direction pad ("D-pad"). Thus, only one type of tactile sensation can be experienced at one time by the user, which limits the immersive experience for the user when interacting with the computer.

SUMMARY OF THE INVENTION

The present invention is directed to a low-cost haptic feedback control on an interface device connected to a computer system, where the control is a directional pad provided with haptic sensations for enhancing interactions and manipulations in a displayed graphical environment or when controlling an electronic device.

More specifically, the present invention relates to a haptic feedback control device coupled to a host computer and outputting forces to a user of the control device, the control device including a housing that can in some embodiments be held and operated by a user in one or more hands. A direction pad is coupled to the housing and is capable of being contacted by the user in at least two different locations to provide two different directional signals to the host computer, each directional signal corresponding to one of the locations on the direction pad. A computer-controlled actuator is coupled to the direction pad and outputs a force directly on the pad.

In one embodiment, each of the locations on the direction pad is an extension of the direction pad, the extensions being part of a unitary member, wherein the unitary member tilts approximately about a pivot point when the user presses one of the locations. In other embodiments, each of the locations on the direction pad is a button separate from a central portion of the direction pad. A sensor, such as one or more contact switches, detects when the locations of the direction pad have been contacted or pressed by the user. An elastomeric layer positioned under the direction pad can provide conductive portions to engage the contact switches. The direction pad is preferably capable of being contacted by the user in four different locations, each location providing a different directional signal to the host computer.

The actuator can be a linear actuator that provides an output force in a linear degree of freedom, e.g. approximately perpendicular to the top surface of the direction pad, or a rotary actuator that provides an output force in a rotary degree of freedom, where at least one member couples the actuator to the directional pad which converts the rotary output force to an approximately linear output force imparted on the direction pad. The actuator can be a voice coil actuator, a piezo-electric actuator, a pager motor, a solenoid, or other type. The actuator can output a vibration or a pulse tactile sensation on the direction pad. The computer displays a graphical environment which with the user interacts using the control device, and the control device can be a game controller, a mouse, a remote control device, or other type of device.

A microprocessor separate from the computer can receive force information from the host computer and provide control signals based on the force information to control the actuator. The user can interact with a graphical environment using said control device, such as a game, web page, or graphical user interface. In some embodiments, a sensor can be used to detect motion or position of the direction pad approximately perpendicularly to a top surface of the direction pad, wherein an input signal based on the detected motion or position is sent to the computer. In some embodiments, the direction pad is caused to move to a lower position when a user-controlled graphical object is moved over a selectable graphical object, to make the selection easier. Or, the direction pad can be moved to different positions on an axis approximately perpendicular to a top surface of the direction pad, the different positions based on a desired 3-D elevation of an object or area displayed in the graphical environment. A method for providing haptic feedback to a direction pad of an interface device includes similar features.

The present invention advantageously provides haptic feedback device to a direction pad of an interface device. The direction pad haptic feedback can be independent of any other haptic feedback provided for the device, allowing a greater variety of tactile sensations and different tactile sensations to be output simultaneously. The haptic feedback direction pad is significantly lower in cost than many other types of haptic feedback devices and is thus quite suitable for home consumer applications. The embodiments described allow crisp forces and a variety of sensations to be output to enhance the user's interaction and experience with a computer application or electronic device.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1A:
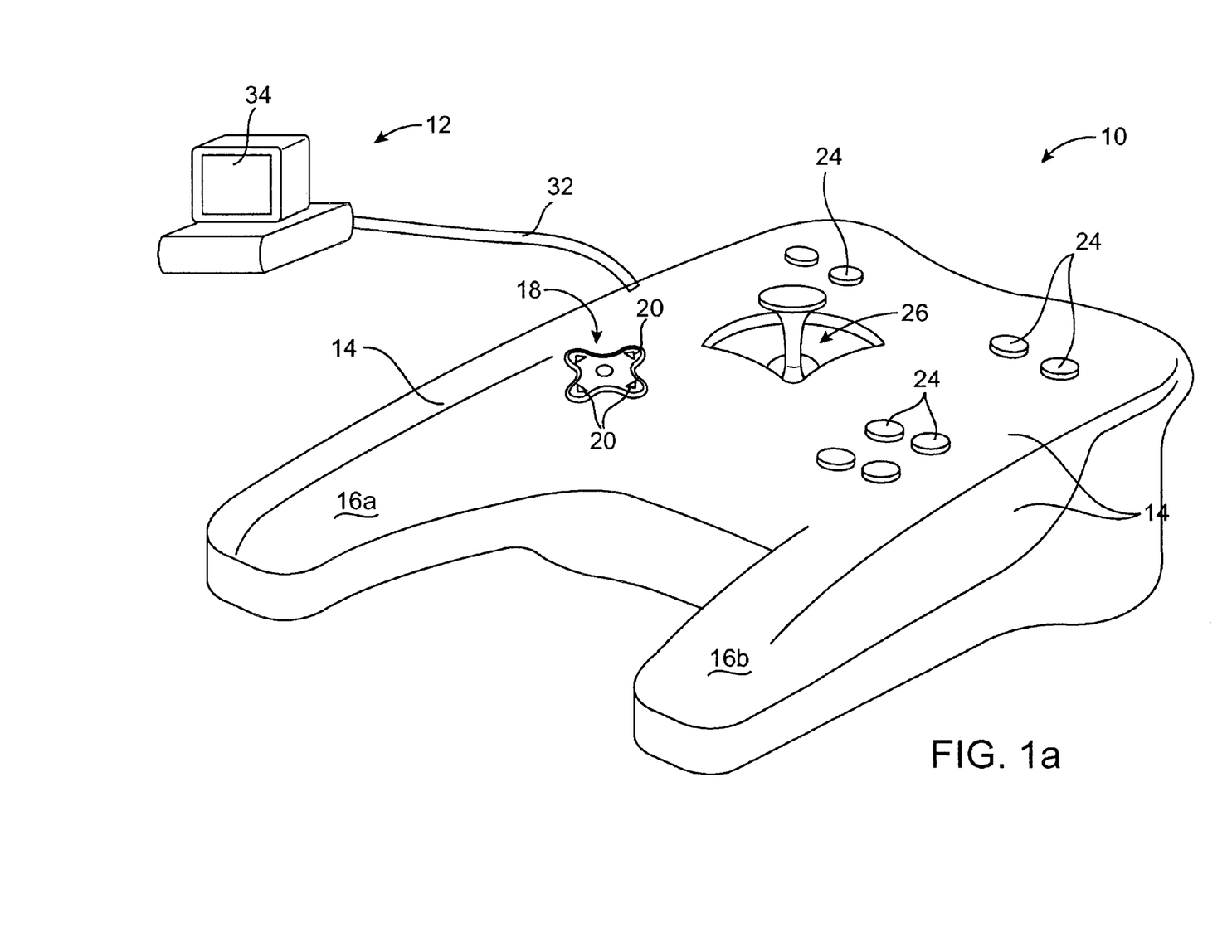
FIG. 1a is a perspective view of a gamepad control including the directional pad of the present invention.

FIG. 1a is a perspective view of one example of a force feedback interface device 10 including the active tactile direction pad of the present invention. The device is used for interfacing a user with a computer generated environment implemented by a host computer 12.

Interface device 10 of the described embodiment is in the form of a handheld controller, of similar shape and size to many "gamepads" currently available for video game console systems. A housing 14 of the interface device 10 is shaped to easily accommodate two hands gripping the device at the gripping projections 16a and 16b. In the described embodiment, the user accesses the various controls on the device 10 with his or her fingers. In alternate embodiments, the interface device can take a wide variety of forms, including devices that rest on a tabletop or other surface, stand-up arcade game machines, laptop devices or other devices worn on the person, handheld or used with a single hand of the user, etc.

A direction pad ("d-pad" or "joypad") 18 is included on device 10 to allow the user to provide directional input to the host computer 12. In its most common implementation, the direction pad 18 is approximately shaped like a cross or disc having four extensions or directional positions (all referred to as "extensions" herein) radiating from a central point at a 90-degree spacing, where the user can press down on one of the extensions 20 to provide a directional input signal to the host computer for the corresponding direction. Typically, the direction pad 18 is tilted approximately about a pivot point, e.g. when one of the extension is pressed, the entire pad tilts as a single unit. In other embodiments, just the extension portion 20 that is pressed can move relative to the other parts of pad 18. In yet other embodiments, a contact sensor can be provided in the pad 18 at each extension 20 so that the presence of a finger is detected with mechanical switches and no tilting motion or pressing motion is required.

Two adjacent extensions 20 can be simultaneously pressed to provide input for the appropriate diagonal direction between the extensions. In other embodiments, the direction pad 18 can include eight extensions or other number of extensions. The directional input is most commonly used to move a user-controlled graphical object in the direction corresponding to the direction of the extension, e.g. pressing on the "up" extension moves a cursor or character up or forward, pressing "left" moves the cursor or character left, etc. Also, in some embodiments, the direction pad 18 can be pressed down as a single piece (e.g., from the center) to provide a different input signal than the signals provided when pressing the extensions 20. For example, the entire pad 18 can be pressed to provide the equivalent of a single mouse-click to select an object pointed to by a cursor. A contact switch can be positioned at the end of the downward travel of the pad to provide the signal, or other types of switches or sensors can be used (optical, magnetic, etc.).

In the present invention, the direction pad 18 is provided with the ability to output haptic feedback such as tactile sensations to the user who is contacting the direction pad 18. Various embodiments detailing the structure of the haptic feedback direction pad are described in greater detail below. Preferably, the forces output on the pad are linear and along the z-axis, approximately perpendicular to the top surface of the pad 18. Herein, the "top surface" of the pad is generally meant to refer to the overall x-y orientation of the surface of the pad, since there may be several actual top surfaces, e.g. on a pad having bumps or ridges on its top surface. Using one or more actuators and sensors coupled to the direction pad (or other controls), a variety of force sensations can be output to the user who is contacting the button. For example, jolts, vibrations (varying or constant amplitude), and textures can be output. Forces can be at least in part based on the position of the direction pad in a degree of freedom, and/or on the location or state of a controlled object in the graphical environment of the host computer, and/or independent of direction pad position or object state. Such forces output on the pad 18 are considered "computer-controlled" since a microprocessor or other electronic controller is controlling the magnitude and/or direction of the force output of the actuator(s) using electronic signals. In some embodiments, the entire pad 18 is provided with haptic sensations as a single unitary member; in other embodiments, some or all of extensions 20 can each be provided with its own haptic feedback actuator and related transmissions so that haptic sensations can be provided for only a particular extension 20 (and in some embodiments the center portion of the pad 18 can include its own actuator for sensations independent of the sensations provided for each extension 20).

One advantage of the present invention is that haptic sensations can be output on the direction pad even when the direction pad is being held at a limit to its movement by the user. In joystick devices, the device is often unable to output a haptic sensation to the joystick handle when the handle is being held at a limit by the user, e.g. when the user has moved the joystick fully in one direction during a game. This is because the physical stop which the joystick is held against prevents motion of the stick in that direction. However, in the present direction pad invention, the direction pad can be held continuously in one direction (e.g. one or more extensions 20 can be continuously pressed) and haptic sensations can still be output, since the preferred haptic direction is along the z-axis. Thus there is no loss of haptic fidelity when using the direction pad for input to the host computer.

In some embodiments, the direction pad can also or alternatively provide a proportional input to a host computer, indicating the distance or amount that an extension of the pad is pushed. Forces can be output on the control by an actuator in the device 10 as the user moves it. These forces can be colocated such that the user feels the forces in the degree of freedom of movement of the pad extension. For example, a spring or damping resistance force can be applied to resist movement of the extension (or to resist motion of the entire pad 18 if pressing it from the center of the pad 18). Also, in a different alternate embodiment, forces can be applied to the direction pad 18 to cause side-to-side (e.g., x-y) motion of the pad in addition to or instead of z-axis motion. For example, one linear actuator can provide motion for the x-axis, and a second linear actuator can provide motion for the y-axis.

One or more buttons 24 can also be provided on the surface of the housing 14 of the device 10. The user's hands have easy access to the buttons, each of which may be pressed by the user to provide a distinct input signal to the host computer 12. In some embodiments, one or more of the buttons 24 can be provided with tactile feedback similarly to the embodiments of the direction pad 18 described below.

A finger joystick 26 can be included in device 10 that projects out of the top surface of the housing 14 to be manipulated by the user in one or more degrees of freedom. The user can grasp each of grips 16a and 16b of the device and use a thumb or finger to manipulate the joystick 26 in two degrees of freedom (or three or more degrees of freedom in some embodiments). This motion is translated into input signals provided to the host computer 12, and can be different signals than those provided by the direction pad 18. In some embodiments, a additional linear or spin degrees of freedom can be provided for the joystick. In other embodiments, a sphere can be provided instead of or in addition to the joystick 26, where one or more portions of the sphere can extend out of left, right, top and/or bottom sides of the housing 14, e.g., allowing at least two fingers of the user to grip the sphere. The sphere may be rotated in place within two rotary degrees of freedom and operate similarly to a joystick, as described in detail in copending provisional application No. 60/133,208, incorporated herein by reference.

Instead of or in addition to buttons 26 and direction pad 28, other controls may be placed within easy reach of the hands grasping the housing 14. For example, one or more trigger buttons can be positioned on the underside of the housing and can be pressed by the fingers of the user. Other controls can also be provided on various locations of the device 10, such as a dial or slider for throttle control in a game, a four- or eight-way hat switch, knobs, trackballs, a roller or sphere, etc. Any of these controls can also be provided with haptic feedback, such as tactile feedback. For example, embodiments of buttons, direction pads, and knobs having force feedback are described in copending patent applications Ser. No. 09/156,802, filed Sep. 17, 1998, and Ser. No 09/179,382, filed Oct. 26, 1998, all incorporated herein by reference. The forces can be colocated such that the user feels the forces in the degree of freedom of movement of the button or direction pad; or, the button, direction pad, or other control can be provided with tactile sensations such as vibrations.

Furthermore, the housing itself and/or a moveable portion of the housing which is contacted by the user when the user operates the device can provide tactile feedback as described in copending patent application Ser. No. 09/156,802, incorporated herein by reference. Thus, both the housing can provide tactile feedback (e.g., through the use of an eccentric rotating mass on a motor coupled to the housing) and the directional pad 18 can provide separate tactile feedback. This allows the host to control two different tactile sensations simultaneously to the user; for example, a vibration of a low frequency can be conveyed through the housing to the user and a higher frequency vibration can be conveyed to the user through the directional pad 18. Each other button or other control provided with haptic feedback can also provide tactile feedback independently from the other controls.

Interface device 10 is coupled to host computer 12 by a bus 32, which can be any of several types of communication media. For example, a serial interface bus, parallel interface bus, or wireless communication link can be used (radio, infrared, etc.). Specific implementations can include Universal Serial Bus (USB), IEEE 1394 (Firewire), RS-232, or other standards.

The interface device 10 includes circuitry necessary to report control signals to the host computer 12 and to process command signals from the host computer 12. For example, sensors (and related circuitry) such as contact switches in elastomeric layers (described below) can be used to report the direction pressed by the user for the direction pad 18. Contact switches can be used as sensors for buttons, and potentiometers, optical encoders, or switches can be used to detect the position of the joystick and report that position to the host. The device also preferable includes circuitry that receives command signals from the host and outputs tactile sensations in accordance with the command signals using one or more device actuators. In some embodiments, a separate, local microprocessor can be provided on the device to both report sensor data to the host and to carry out commands received from the host, such commands including, for example, the type of tactile sensation and parameters describing the commanded tactile sensation. The microprocessor can implement tactile sensations independently after receiving a host command by controlling the device actuators; or, the host can maintain a greater degree of control over the tactile sensations by controlling actuators more directly. In other embodiments, logic circuitry such as state machines provided on the device 10 can handle tactile sensations as directed by the host computer 12. Architectures and control methods that can be used for reading sensor signals and providing haptic feedback in the device 10 are described in greater detail in U.S. Pat. No. 5,734,373 and copending application Ser. Nos. 60/156,354, 60/133,208, 09/376,649, and 60/160,401, all incorporated herein by reference.

Host computer 12 is preferably a video game console, personal computer, workstation, or other computing or electronic device. One of a variety of home video game systems, such as systems available from Nintendo, Sega, or Sony, a television "set top box" or a "network computer", etc. can be used. Alternatively, personal computers, such as an IBM-compatible or Macintosh personal computer, or a workstation, such as a SUN or Silicon Graphics workstation, can be used. Or, the host 12 and device 10 can be included in a single housing in an arcade game machine, portable or handheld computer, vehicular computer, or other device. Host computer system 12 preferably implements a host application program with which a user is interacting via peripherals and interface device 10. For example, the host application program can be a video or computer game, medical simulation, scientific analysis program, operating system, graphical user interface, or other application program.

The host application preferably displays graphical images of the environment on a display device included with the host computer, such as a display screen 34 (such as a television, flat panel display, CRT, etc.), 3D display goggles, etc. The software and environment running on the host computer 12 may be of a wide variety. For example, the host application program can be a video game, simulation, graphical user interface (GUI), Web page or browser that implements HTML or VRML instructions, scientific analysis program, virtual reality training program or application, or other application program that utilizes input from the interface device 10 and (in force feedback embodiments) outputs force feedback commands to the controller 10. For example, many game application programs include force feedback functionality and may communicate with the force feedback interface device 10 using a standard protocol/drivers such as I-Force®, FEELit®, or Touchsense™ available from Immersion Corporation of San Jose, Calif. Herein, computer 12 may be referred as displaying "graphical objects" or "entities." These objects are not physical objects, but are logical software unit collections of data and/or procedures that may be displayed as images by computer 12 on display screen 34, as is well known to those skilled in the art. A displayed cursor or a simulated cockpit of an aircraft might be considered a graphical object.

In operation, the controls of interface device 10 are manipulated by the user, which indicates to the computer how to update the implemented application program(s). An electronic interface included in housing 14 of device 10 can couple the device 10 to the computer 12. The host computer 12 receives the input from the interface device and updates an application program in response to the input. For example, a game presents a graphical environment in which the user controls one or more graphical objects or entities using the direction pad 18 and/or other controls such as joystick 26 and buttons 24. The host computer can provide force feedback commands and/or data to the device 10 to cause haptic feedback to be output on direction pad 18 and other controls if so implemented.

Figure 1B:
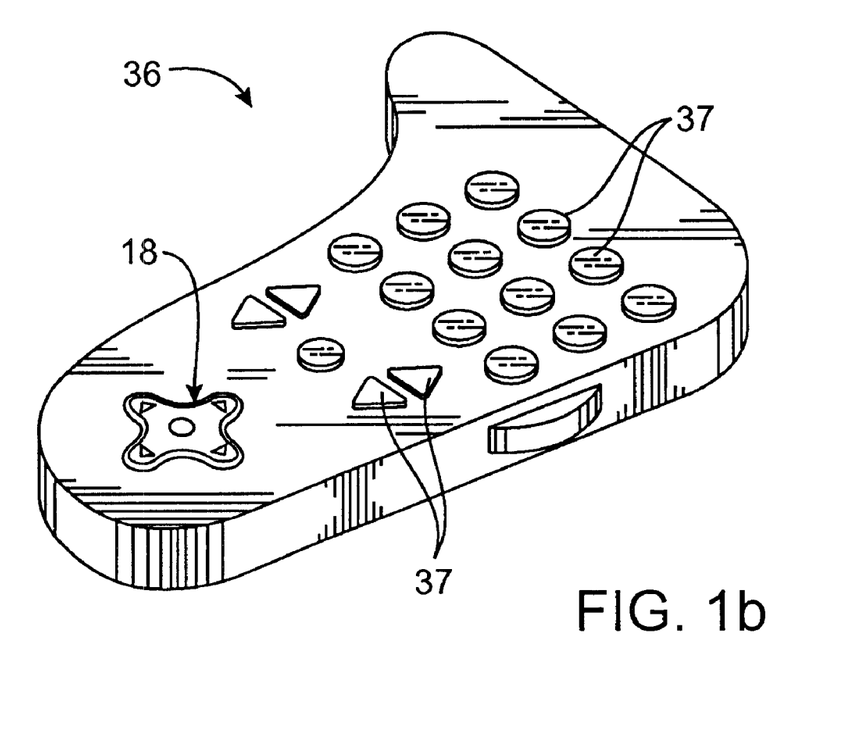
FIG. 1b is a perspective view of a remote control device including the directional pad of the present invention.

FIG. 1a is a perspective view of another embodiment of a device which can include the active direction pad 18 of the present invention. The device can be a handheld remote control device 36, which the user grasps in one hand and manipulates controls to access the functions of an electronic device or appliance remotely by a user (such as a television, video cassette recorder or DVD player, audio/video receiver, Internet or network computer connected to a television, etc.). For example, several buttons 37 can be included on the remote control device 36 to manipulate functions of the controlled apparatus. A direction pad 18 can also be provided to allow the user to provide more sophisticated directional input. For example, a controlled apparatus may have a selection screen in which a cursor may be moved, and the direction pad 18 can be manipulated to control the cursor in two dimensions.

In one application, the controlled apparatus can be a computer system such as Web-TV from Microsoft Corp. or other computing device which displays a graphical user interface and/or web pages accessed over a network such as the Internet. The user can control the direction of the cursor by pressing the direction extensions of the direction pad 18. The cursor can be used to select and/or manipulate icons, windows, menu items, graphical buttons, slider bars, scroll bars, or other graphical objects in a graphical user interface or desktop interface. The cursor can also be used to select and/or manipulate graphical objects on a web page, such as links, images, buttons, etc.

Forces are preferably associated with the interactions of the cursor with displayed graphical objects. For example, a jolt or "pulse" sensation can be output, which is a single impulse of force that quickly rises to the desired magnitude and then is turned off or quickly decays back to zero or small magnitude. The direction pad 18 can be moved along the z-axis in one direction and then the opposite direction to provide the pulse. A vibration sensation can also be output, which is a time-varying force that is typically periodic. The vibration can cause the direction pad 18 to oscillate back and forth on the z axis, and can be output by the microprocessor to simulate a particular effect that is occurring in a host application. A constant force can also be output on the user object. This is a force having a constant magnitude that is output for a specified period of time or until a condition occurs, such as a user-controlled cursor or graphical object being moved to a predefined location in a displayed graphical environment. The direction pad can be moved to a particular position, pressing against the user's finger or hand.

Another type of force sensation that can be output on the direction pad 18 is a texture force. This type of force is similar to a pulse force, but depends on the position of the mouse in its planar workspace (or on the position of the cursor in the graphical environment). Thus, texture bumps are output depending on whether the cursor has moved over a location of a bump in a graphical object. This type of force is spatially-dependent, i.e. a force is output depending on the sensed position of the mouse as it moves over a designated textured area; when the mouse is positioned between "bumps" of the texture, no force is output, and when the mouse moves over a bump, a force is output. This can be achieved by host control (e.g., the host sends the pulse signals as the cursor is dragged over the grating) or by local control (e.g., the host sends a high level command with texture parameters and the sensation is directly controlled by the device). In other cases a texture can be performed by presenting a vibration to a user, the vibration being dependent upon the current velocity of the mouse in its planar workspace. When the mouse is stationary, the vibration is deactivated; as the mouse moves faster, the frequency and magnitude of the vibration is increased. This sensation could be controlled locally by the device processor, or be controlled by the host. Local control by the device may eliminate communication burden in some embodiments. Other spatial force sensations can also be output. In addition, any of the described force sensations herein can be output simultaneously or otherwise combined as desired.

Different types of graphical objects can be associated with tactile sensations. Tactile sensations can output on the direction pad 18 based on interaction between a cursor and a window. For example, a z-axis "bump" or pulse can be output on the direction pad when the cursor is moved over a border of a window to signal the user of the location of the cursor. When the cursor is moved within the window's borders, a texture force sensation can be output. The texture can be a series of bumps that are spatially arranged within the area of the window in a predefined pattern; when the cursor moves over a designated bump area, a bump force is output on the direction pad. A pulse or bump force can be output when the cursor is moved over a selectable object, such as a link in a displayed web page or an icon. A vibration can also be output to signify a graphical object which the cursor is currently positioned over. Furthermore, features of a document displaying in a window can also be associated with force sensations. For example, a pulse can be output on the direction pad when a page break in a document is scrolled past a particular area of the window. Page breaks or line breaks in a document can similarly be associated with force sensations such as bumps or vibrations.

Furthermore, a menu items in a displayed menu can be selected by the user after a menu heading or graphical button is selected. The individual menu items in the menu can be associated with forces. For example, vertical (z-axis) bumps or pulses can be output when the cursor is moved over the border between menu items. The sensations for certain menu choices can be stronger than others to indicate importance or frequency of use, i.e., the most used menu choices can be associated with higher-magnitude (stronger) pulses than the less used menu choices. Also, disabled menu choices can have a weaker pulse, or no pulse, to indicate that the menu choice is not enabled at that time. Furthermore, when providing tiled menus in which a sub-menu is displayed after a particular menu element is selected, as in Microsoft Windows™, pulse sensations can be sent when a sub-menu is displayed. This can be very useful because users may not expect a sub-menu to be displayed when moving a cursor on a menu element. Icons can be associated with textures, pulses, and vibrations similarly to the windows described above. Drawing or CAD programs also have many features which can be associated with similar haptic sensations, such as displayed (or invisible) grid lines or dots, control points of a drawn object, etc.

In other related interactions, when a rate control or scrolling function is performed with the pad, a vibration can be displayed on the device to indicate that scrolling is in process. When reaching the end of a numerical range that is being adjusted (such as volume), a pulse can be output to indicate that the end of the range has been reached. Pulse sensations can be used to indicate the location of the "ticks" for discrete values or settings in the adjusted range. A pulse can also be output to inform the user when the center of the range is reached. Different strength pulses can also be used, larger strength indicating the more important ticks. In other instances, strength and/or frequency of a vibration can be correlated with the adjustment of a control to indicate magnitude of the volume or other adjusted value. In other interactions, a vibration sensation can be used to indicate that a control function is active. Furthermore, in some cases a user performs a function, like selection or cutting or pasting a document, and there is a delay between the button press that commands the function and the execution of the function, due to processing delays or other delays. A pulse sensation can be used to indicate that the function (the cut or paste) has been executed.

In embodiments in which the direction pad has a greater degree of freedom along the z-axis and/or can be moved along the z-axis by the user to provide a range of input signals within the movement range along that axis, more complex force sensations can be output. For example, a spring force provided by the actuator can be output rather than (or in addition to) a force provided by a mechanical centering spring. The magnitude of this force sensation can be dependent on the distance of the direction pad from the origin or center position. A sensor can be used to sense the position of the direction pad in the z-axis degree of freedom. This spring force sensation can be associated with graphical objects and can be differentiated using magnitude. For example, when the user positions a cursor over a graphical button and presses the direction pad, a light spring force resists the pressed motion of the pad. When the user positions the cursor over a different graphical object, such as an icon, a heavy spring force is output having a greater magnitude than the spring force for the graphical button.

Similar to the spring force, a "well" sensation can be output. When the cursor is positioned over a selectable graphical object, the direction pad can be made to dip or move downward a slight amount as if the cursor were then at a lower elevation; this can also ease the selection of that graphical object since the direction pad would need to be pressed downward by a lesser amount to send a command signal (either the entire pad or one of the extensions of the pad). This sensation can be used to indicate the status of a graphical object or to differentiate different graphical objects having different well "depths". In other embodiments having a button with a relatively large range of movement, a simulated 3-D surface can be simulated, where the direction pad is moved to different elevations in correspondence with simulated elevations of graphical objects, displayed terrain features, etc.

Furthermore, the magnitude of output forces can depend on the event or interaction in the graphical environment. For example, the force pulse can be a different magnitude of force depending on the type of graphical object encountered by the cursor. For example, a pulses of higher magnitude can be output when the cursor moves over windows, while pulses of lower magnitude can be output when the cursor moves over icons. The magnitude of the pulses can also depend on other characteristics of graphical objects, such as an active window as distinguished a background window, file folder icons of different priorities designated by the user, icons for games as distinguished from icons for business applications, different menu items in a drop-down menu, etc.

User-independent events can also be relayed to the user using haptic sensations on the direction pad. An event occurring within the graphical user interface, such as an appointment reminder, receipt of email, etc., can be signified using a vibration, pulse, or other time-based force. The force sensation can be varied to signify different events of the same type. For example, vibrations of different frequency can each be used to differentiate different events or different characteristics of events, such as particular users sending email, the priority of an event, or the initiation or conclusion of particular tasks (e.g. the downloading of a document or data over a network). When the host system is "thinking," requiring the user to wait while a function is being performed or accessed (usually when a timer is displayed by the host) it is often a surprise when the function is complete. If the user takes his or her eyes off the screen, he or she may not be aware that the function is complete. A pulse sensation can be sent to indicate that the "thinking" is over.

A software designer may want to allow a user to be able to select options or a software function by positioning a cursor over an area on the screen using the direction pad, but not require pressing a button on the device to actually select the option. Currently, it is problematic to allow such selection because a user has physical confirmation of execution when pressing a button. A pulse sent to the direction pad of the present invention can act as that physical confirmation without the user having to press a button or other control for selection. For example, a user can position a cursor over a web page element, and once the cursor is within the desired region for a given period of time, an associated function can be executed. This is indicated to the user through a tactile pulse sent to the pad 18.

The above-described force sensations can also be used in games or simulations. For example, a vibration can be output when a user-controlled racing car is driving on a dirt shoulder of a displayed road, a pulse can be output when the car collides with another object, and a varying-frequency vibration can be output when a vehicle engine starts and rumbles. The magnitude of pulses can be based on the severity of a collision or explosion, the size of the controlled graphical object or entity (and/or the size of a different graphical object/entity that is interacted with), etc. Force sensations can also be output based on user-independent events in the game or simulation, such as pulses when bullets are fired at the user's character.

The above haptic sensations can be similar to those described in copending patent application Ser. Nos. 09/253, 132, and 09/456,887, now U.S. Pat. No. 6,211,861, which are both incorporated herein by reference. Other control devices or grips that can include the direction pad 18 and/or other force feedback controls include a mouse or trackball device for manipulating a cursor or other graphical objects in a computer-generated environment; or a pressure sphere, stylus, or the like. For example, the direction pad 18 can be provided on the housing of a computer mouse to provide additional input to the host computer. Furthermore, selective disturbance filtering of forces, as described in copending patent application Ser. No. 08/839,249, and shaping of force signals to drive the direction pad with impulse waves as described in U.S. Pat. No. 5,959,613, can be used with the present invention, both disclosures incorporated herein by reference. Such impulses are also effective when driven with stored power in a battery on the device 10 and/or from a bus such as USB.

Figure 2A:
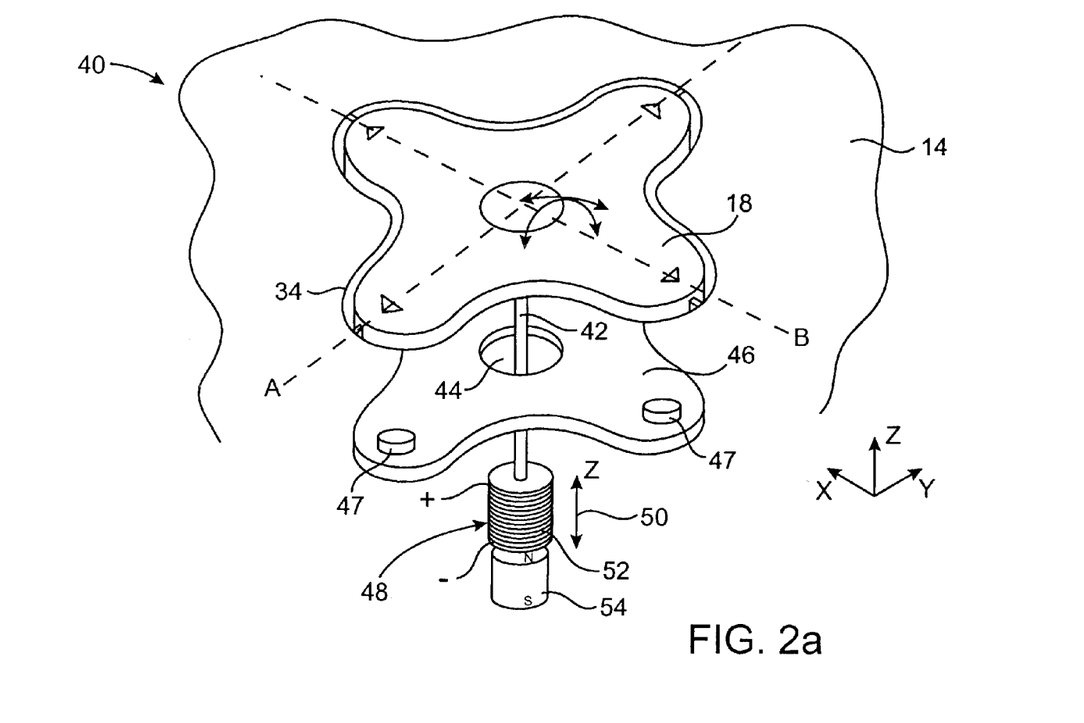
FIGS. 2a and 2b are perspective exploded view and side elevational views, respectively, of a first embodiment of a direction pad of the present invention for providing haptic feedback to the user.
Figure 2B:
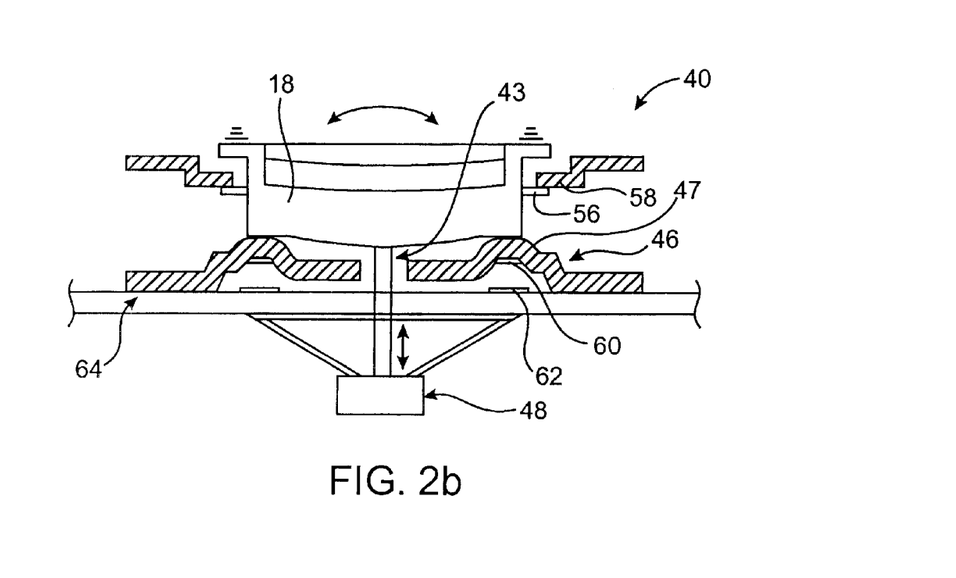

FIG. 2a is a perspective exploded view and FIG. 2b is a side elevational view of a first embodiment 40 of a direction pad 18 of the present invention for providing haptic feedback to the user. In one embodiment, an aperture 34 is provided in housing 14 and the direction pad 18 is positioned in the aperture. Direction pad 18 is coupled at approximately its center portion to a vertical shaft 42 which extends through an aperture 44 in an elastomeric keypad 46 positioned below the direction pad 18. The shaft 42 is coupled at its other end to an actuator 48 that is operative to drive the shaft 42 linearly in both directions along a z-axis 50. In the described embodiment, the actuator 48 is a linear voice coil actuator that includes a coil 52 and a magnet 54. A current is flowed through the coil and interacts with the magnetic field of the magnet to cause a force on shaft 42, as is well known to those skilled in the art. The actuator 48 can also be a standard speaker, as shown in FIG. 2b, or any of a number of different types of actuators, such as a piezoelectric actuator, an E-core type actuator (as described in copending application Ser. No. 60/133,208, incorporated herein by reference), a solenoid, a pager motor, a DC motor, a linear voice coil actuator as described in application Ser. No. 09/156,802, or other type of actuator. Furthermore, the actuator 48 can be positioned to output linear motion along an axis perpendicular to the z-axis or along another direction different from the z-axis (rotary or linear), where a mechanism converts such output motion to linear motion along the z-axis as is well known to those skilled in the art.

In operation, the directional pad 18 can be rotated approximately about axis A or axis B when one of the extensions 20 of the pad 18 is pressed by the user. This rotation can also be considered approximate linear motion; to the user, the movement of the extension 20 may appear to be linear in a direction into the housing, and in some embodiments actual linear-moving extensions can be provided. The direction pad 18 can be coupled to the shaft 42 in a variety of ways to permit this rotation. For example, the shaft 42 can include a flexible portion 43 at its end coupled to the pad 18 to allow the pad 18 to rotate about axes A and B via flex or compliance. Alternatively, a mechanical coupling can be used, such as a hook connection in a ring, a ball and socket joint, or other coupling.

The elastomeric keypad 46 is made of a rubberlike, flexible material that allows pressure to be transmitted therethrough yet provides a spring return to center the directional pad 18 in a rest or origin position. Thus, when no pressure is applied to the pad, raised portions 47 of the elastomeric keypad bias tabs 56 of the directional pad 18 against the stops 56 connected to the housing 14, preventing the pad 18 from being moved out of the housing 14. When one side of the directional pad 18 is pressed down to cause rotation about axis A and/or axis B, the edge of the pad 18 pushes down a raised portion 47 to cause a conductive portion 60 of the layer 46 to engage electrical contacts 62 provided beneath the raised portion 47 on a printed circuit board 64 or other substrate or layer. This engagement causes a signal to be transmitted to the host computer 12 (or to a local microprocessor or other controller on the device 10) indicating that the particular extension on the direction pad has been pressed.

The actuator 48 preferably provides a variety of tactile sensations to the direction pad 18 in the linear tactile degree of freedom along axis Z. For example, the coil of the actuator 48 can be oscillated at a high frequency to produce a vibration on the direction pad. The range of motion allowed by direction pad 18 or shaft along the z axis 50 is limited to a shorter range than the distance required to engage portion 60 of layer 46 with contact 62; this prevents the actuator 48 from causing one or more false button presses to be signalled. In vibrotactile embodiments, only a very small range of motion is required to produce effective pulses (volts) or vibrations on the direction pad 18. If the direction pad 18 is also used as an analog input depending on the distance the entire pad is moved along the z-axis, and/or if kinesthetic (force) feedback is applied in the z-axis degree of freedom, then a greater range of motion is desirable.

Figure 3A:
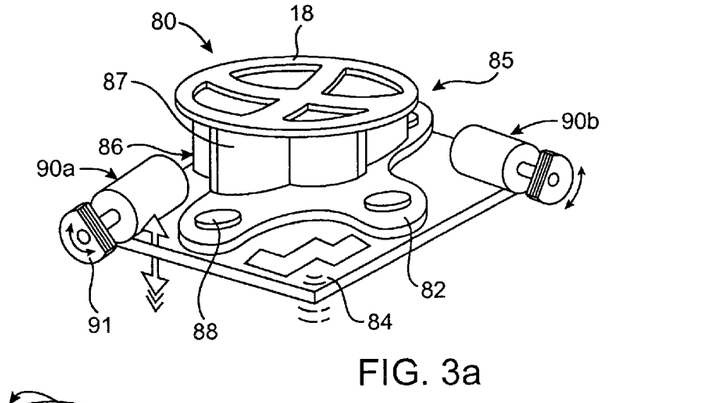
FIG. 3a is a perspective view of a different embodiment of the direction pad of the present invention, which is integrated with an elastomeric layer and a printed circuit board in a sub-assembly.

FIG. 3a is a perspective view of a different embodiment 80 of the direction pad of the present invention. Direction pad 18 (here shown as a disc with apertures or indentations at each of the four directions of the direction pad) is integrated with an elastomeric layer 82 and a printed circuit board 84 in a sub-assembly 85. A support 86 is interposed between the elastomeric layer 82 and the direction pad 18, where the support 86 is at least partially flexible to allow a portion 87 of the support to move down against the raised portion 88 of the elastomeric layer when the appropriate extension (or other portion) of the directional pad 18 is pressed by the user. The elastomeric layer 82 is coupled to the support 86 and the printed circuit board 84, where a conductive portion of the raised portion 88 engages electrical contacts of the board 84 similar to the embodiment of FIGS. 2a and 2b.

Actuators 90a and 90b are coupled to the printed circuit board 84 to provide tactile sensations to the direction pad 18. In the described embodiment, the actuators 90 are DC motors having a rotating shaft, and include an eccentric mass 91 coupled to each spinning shaft. When the masses are rotated, a tactile sensation (such as a vibration) is caused on the printed circuit board 84. Since the directional pad 18 is part of the same assembly as the board, the pad 18 is provided with the same tactile sensation as the board 84. To provide different-feeling tactile sensations, each actuator 90 can be controlled to produce, for example, vibrations at different frequency and/or magnitude. The combination of different tactile sensations produced by each actuator can provide a wide variety of tactile sensations. In other embodiments, a single actuator 90 can be used; in still other embodiments, three or more actuators can be provided. Furthermore, many different types of actuators can be used, as described with reference to FIG. 2a and 2b.

Figure 3B:
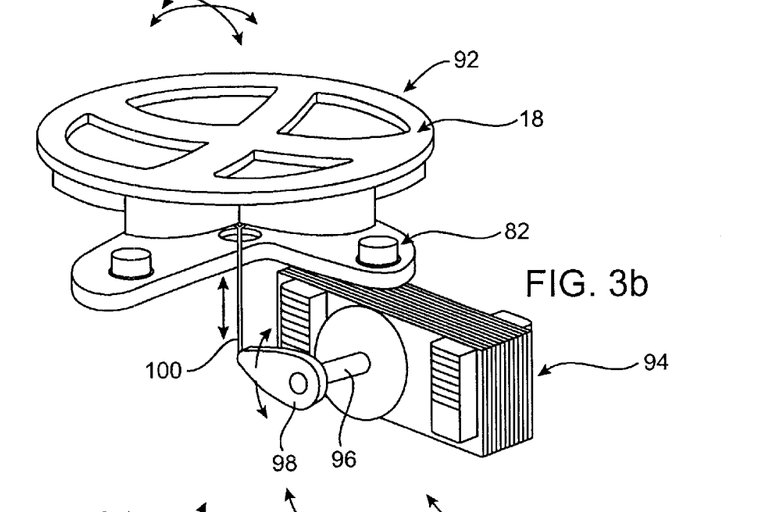
FIGS. 3b, 3c, 3d, and 3e illustrate different actuators for use with the direction pad of the present invention.

One example of a different actuator used with the embodiment of FIG. 3a is shown in FIG. 3b. A direction pad 18 is coupled to support 86, which is coupled to an elastomeric layer 82 in a subassembly 92, similarly to the embodiment of FIG. 3a. A printed circuit board (not shown) can also be included in the subassembly; or, switches can be self-contained in the elastomeric layer (which can be used in any of the elastomeric layer embodiments described herein). An actuator 94 having a spinning shaft 96 is coupled to the subassembly 92 by a member 98 and a vertical shaft 100, where the rotation of the shaft 96 is converted to z-axis motion of shaft 100. When the shaft 96 of the actuator 94 is oscillated, a vibration is imparted through the shaft 100 to the direction pad 18. The shaft 100 can be coupled to the subassembly 92 to provide tactile sensations to the entire subassembly; or, in some embodiments, the shaft 100 can be coupled directly to the directional pad 18. The actuator 94 shown is an E-core actuator, described in greater detail in copending provisional application No. 60/133,208; the actuator can include two coils for greater magnitude tactile sensations, or the actuator can include only one coil if space is to be conserved. In other embodiments, other types of actuators can be used.

Figure 3C:
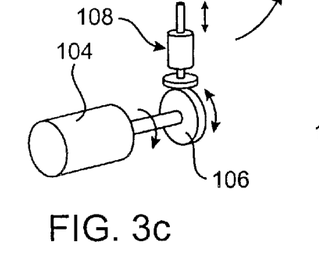
Figure 3D:
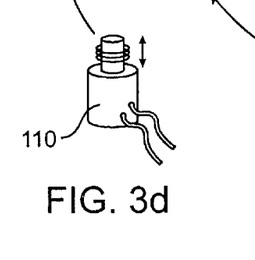
Figure 3E:
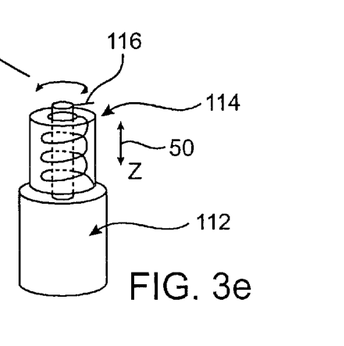

Other types of actuators which can be used in the various embodiments disclosed herein are shown in FIGS. 3c, 3d, and 3e. In FIG. 3c, a small pager motor 104 has a rotating shaft that is coupled to a cam 106, which is in turn coupled to a linear-moving member 108. The member 108 is coupled to a direction pad 18 or subassembly 92. In FIG. 3d, a solenoid 110 having a vertically-moving portion is shown. In FIG. 3e, a pager motor 112 or other actuator having a rotating shaft is shown. An actuator plug 114 has a high-pitch internal thread which mates with a pin 116 extending from the side of the rotating shaft of the motor, thus providing a low cost lead screw. When the shaft is rotating, the pin causes the plug 114 to move up or down along the z-axis 50; when the shaft is oscillated, an appropriate tactile sensation is provided to a direction pad or subassembly.

Figure 4:
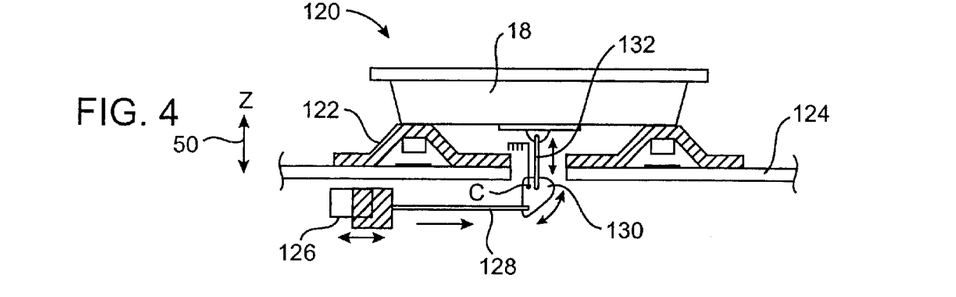
FIG. 4 is a side elevational view of a different embodiment of the direction pad of the present invention in which a linear actuator is used to provide linear motion along an axis different from the z-axis.

FIG. 4 is a side elevation view of another embodiment 120 of the present invention, similar to the embodiment of FIGS. 2a and 2b. A direction pad 18 is supported by an elastomeric layer 122 on a printed circuit board 124, similar to the elastomeric layers described above. An actuator 126, such as a linear voice coil actuator or other type of linear actuator, provides linear motion along an axis different from the z-axis 50. A first member 128 is coupled to actuator 126 at a first end, and is rotatably coupled to a pivoting member 130 at a second end. Pivoting member 130 is rotatably coupled to ground and may pivot about an axis C. A second member 132 is rotatably coupled to the pivoting member 130 at one end and is rotatably coupled to the direction pad 18 at a second end. The pivoting motion of the pivoting member 130 converts the motion of the linear actuator 126 to linear motion along the z-axis 50, and provides tactile feedback to the user via the direction pad 18 along the z-axis.

Figure 5:
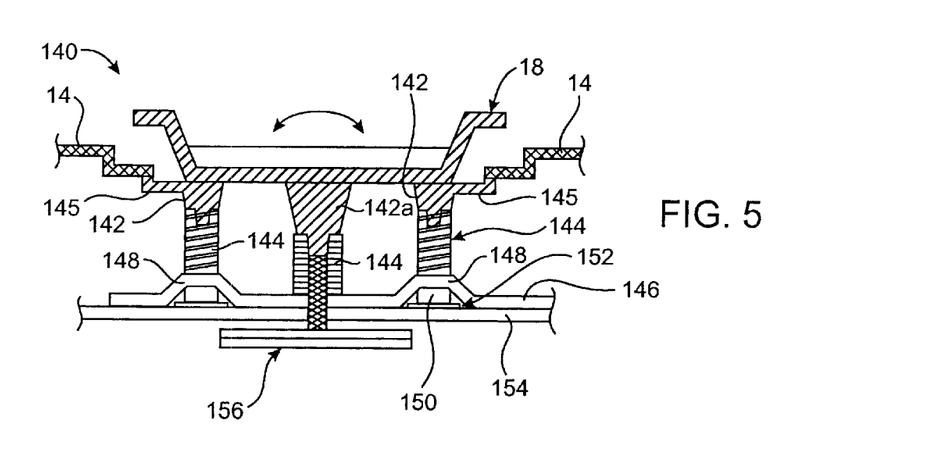
FIG. 5 is a side elevational view of a different embodiment of the direction pad of the present invention in which the direction pad provides analog input based on the amount it is moved.

FIG. 5 is a side elevation view of a different embodiment 140 of the present invention. In this embodiment, a direction pad 18 includes a number of support members 142 which extend downward from the underside of the pad. The members 142 each engage a spring member 144, which in the described embodiment are helical compression springs and where each member 142 fits into the opening at one end of a spring. In the described embodiment, a total of five members 144 are provided, one at each of the extensions/directions of the direction pad 18 and one at the center of the pad. Likewise, there are five springs, each member 144 engaged with an associated spring. The springs 144 are coupled at their other ends to the elastomeric layer 146, which is similar to the elastomeric layers described above. The four springs that are associated with the four main directions of the pad 18 are each coupled to an associated raised portion 148 of the elastomeric layer 146.

When a direction of the pad 18 is pressed by the user, the pressure from the associated spring 144 presses the raised portion 148 and tab 150 down to engage the electrical contact 152 on the printed circuit board 154. In one embodiment, the electrical contact 152 can sense the amount of pressure exerted upon it by the tab 150 and output a signal in proportion to the amount of pressure; such force-magnitude sensors are well known to those skilled in the art. The springs 144 are able to provide an amount of pressure on the contact 152 in proportion to the amount the pad extension is pressed, i.e. the degree of rotation of the directional pad 18 compressing the spring. Thus, an analog controller is provided, where the input signal to the host computer varies depending on the amount the directional pad 18 pressed in a particular direction. The springs 144 also provide upward bias to the direction pad 18 so that the pad will return to an origin position when the user removes any pressure on the pad. The tabs 145 connected to the direction pad 18 engage the housing 14 to prevent the direction pad 18 from being lifted off the housing.

The center spring 142a is coupled at its other end to the elastomeric layer 146 at a flat portion between the raised portions 148, where at least a portion of the center member 144 extends into the middle of the spring 142a. A linking shaft 156 couples the bottom end of the center member 144 to a piezo-electric actuator 156. The operation of piezo-electric actuators to output force based on an input electrical signal is well known to those skilled the art.

In operation, forces output by the actuator 156 is transmitted through the shaft 156 to the direction pad 18 to be felt as tactile sensations by the user. For example, a vibration can be output having a particular frequency and magnitude. Other types of actuators can also be used, as explained for the above embodiments.

Figure 6:
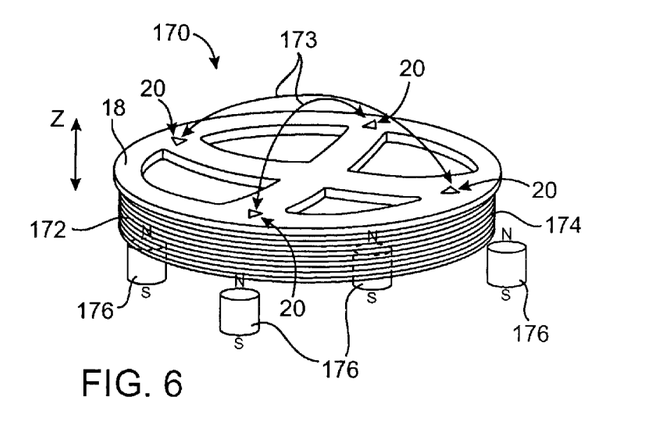
FIG. 6 is a perspective view of a different embodiment of the direction pad of the present invention in which a coil routed around the direction pad and multiple magnets provide haptic feedback on the direction pad.

FIG. 6 is a perspective view of a different embodiment 170 of the direction pad 18 of the present invention, where a direction pad 18 includes a portion 172 that extends below the direction pad. A coil 174 can be wound around the portion 172 as in a voice coil actuator. A number of magnets 176 can be fixed in position relative to the direction pad 18 (such as being coupled to the housing 14 of the device 10). In the described embodiment, four magnets are shown, each spaced under a corresponding extension 20 of the direction pad 18. Different numbers of magnets can be used in other embodiments. When a current is flowed through the coil 174, a force is produced based on the interaction of the magnetic fields from the magnets 176 and the electrical current, as is well known to those skilled in the art. Since there is a single main coil 174, a force from each magnet 176 is produced on the direction pad 18 in the same direction, thus causing all portions of the pad 18 to move up or down along the z-axis, where the force can be controlled in direction and magnitude by controlling the direction and magnitude of current. In other embodiments, additional coils can be provided. For example, a coil loop can be coupled to the pad 18 above each magnet 176, in effect providing several voice coil actuators. The current in each such coil can then be controlled independently, allowing different magnitude and directional forces to be provided from each magnet 176 and its associated coil. This would allow the direction pad 18 to be tilted or be provided with rotational degrees of freedom 173 about a pivot point. Alternatively, the pad 18 could be translated along the z-axis by causing the same magnitude and direction of force from each magnet 176 and associated coil. Or, the coil 174 can be replaced with a single magnet (or multiple magnets) and the magnets 176 can be replaced with coils to allow similar translation and pivoting abilities. Support structures for the directional pad 18 allowing it to move relative to the housing also can be included (not shown).

Figure 7:
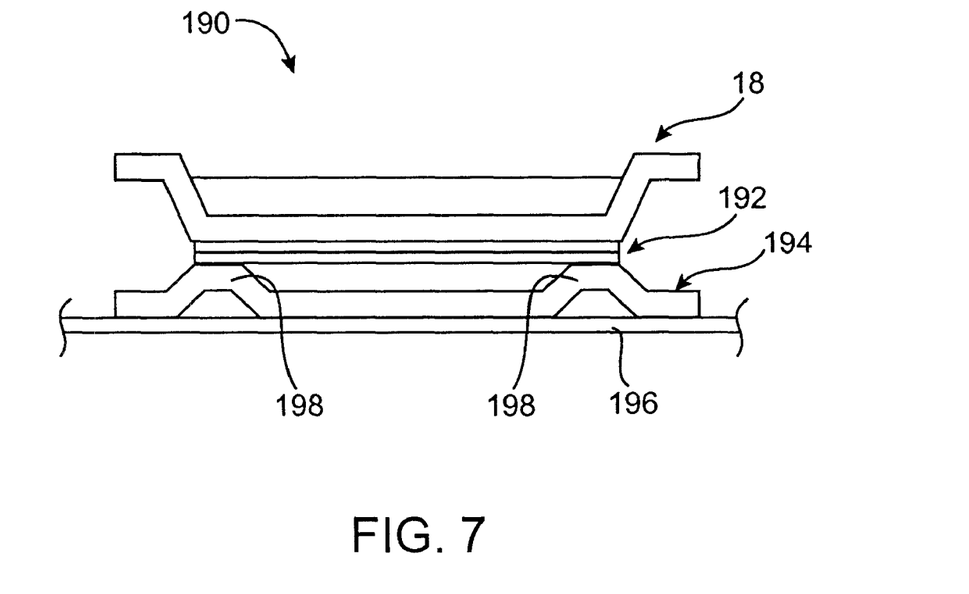
FIG. 7 is a side elevational view of a different embodiment of the present invention in which a piezo-electric actuator is directly coupled to the direction pad of the present invention.

FIG. 7 is a side elevational view of another embodiment 190 of the direction pad 18 of the present invention. In this embodiment, direction pad 18 is directly coupled to a piezoelectric actuator 192, which operates as described above with reference to FIG. 5 to produce a force when an electrical signal is input to the actuator. Since the direction pad 18 is directly coupled to the actuator, any produced forces are directly applied to the direction pad 18. The actuator 192 is coupled to the raised portions 198 of an elastomeric layer 194, which functions to detect extension presses of the direction pad 18 as described in the embodiments above. Since the actuator 192 is coupled to the flexible raised portions 198, the direction pad is able to flex and rotate to allow the user to press on different directions of the pad, and the raised portions 198 provide enough springiness to return the direction pad 18 to its rest position when pressure from the user is removed. The conductive portions of the raised portions 198 engage contacts on the surface of a printed circuit board 196 or other substrate similar to the embodiments described above.

While this invention has been described in terms of several preferred embodiments, it is contemplated that alterations, permutations, and equivalents thereof will become apparent to those skilled in the art upon a reading of the specification and study of the drawings. For example, many different types of actuators can be used to output tactile sensations to the user. Furthermore, many of the features described in one embodiment can be used interchangeably with other embodiments. Furthermore, certain terminology has been used for the purposes of descriptive clarity, and not to limit the present invention.

What is claimed is:

1. A tactile feedback control device for inputting control signals to a computer and for outputting forces to a user of the control device, the control device comprising:
   a housing, said housing capable of being held and operated by a user in one or more hands of said user;
   a direction pad coupled to said housing, said direction pad capable of being contacted by said user in at least two different locations to provide two different directional signals to said host computer, each directional signal corresponding to one of said locations on said direction pad; and
   a computer-controlled actuator coupled to said direction pad, said actuator outputting a force directly on said direction pad to cause said direction pad to move with respect to said housing.

2. A control device as recited in claim 1 further comprising a microprocessor separate from said computer and providing control signals to control said actuator.

3. A control device as recited in claim 1 wherein each of said locations on said direction pad is an extension of said direction pad, said extensions being part of a unitary member, wherein said unitary member tilts approximately about a pivot point when said user presses one of said locations.

4. A control device as recited in claim 1 wherein each of said locations on said direction pad is a button separate from a central portion of said direction pad.

5. A control device as recited in claim 1 further comprising a sensor that detects when said locations of said direction pad have been contacted by said user.

6. A control device as recited in claim 5 wherein said sensor includes a plurality of contact switches.

7. A control device as recited in claim 6 further comprising an elastometric layer positioned under said direction pad, said elastomeric layer providing conductive portions to engage said contact switches.

8. A control device as recited in claim 1 wherein said direction pad is capable of being contacted by said user in four different locations, each location providing a different directional signal to said host computer.

9. A control device as recited in claim 1 wherein said force is a linear force output approximately perpendicularly to a plane of a top surface of said direction pad.

10. A control device as recited in claim 9 wherein said actuator is a linear actuator that provides an output force in a linear degree of freedom.

11. A control device as recited in claim 1 wherein said actuator is a rotary actuator that provides an output force in a rotary degree of freedom.

12. A control device as recited in claim 11 further comprising at least one member coupling said actuator to said directional pad which converts said rotary output force to an approximately linear output force imparted on said direction, said linear output force being approximately perpendicular to a top surface of said direction pad.

13. A control device as recited in claim 1 wherein said actuator includes a voice coil actuator.

14. A control device as recited in claim 1 wherein said actuator includes a piezo-electric actuator.

15. A control device as recited in claim 1 wherein said actuator includes a pager motor.

16. A control device as recited in claim 1 wherein said actuator includes a solenoid.

17. A control device as recited in claim 1 wherein said actuator outputs a vibration or a pulse tactile sensation on said direction pad.

18. A control device as recited in claim 1 wherein said computer displays a graphical environment which with said user interacts using said control device.

19. A control device as recited in claim 18 wherein said control device is a game controller and said computer displays a game.

20. A control device as recited in claim 1 further comprising a sensor for detecting motion or position of said direction pad approximately perpendicularly to a top surface of said direction pad, wherein an input signal based on said detected motion or position is sent to said computer.

21. A control device as recited in claim 9 wherein said linear force can be output on said direction pad to provide a tactile sensation when said direction pad is held at a limit to its travel.

22. A tactile feedback control device for inputting control signals to a host computer and for outputting forces to a user of the control device, the control device comprising:
    a housing;
    a direction pad coupled to said housing, said direction pad capable of being contacted by said user in at least two different locations to provide two different directional signals to said host computer, each directional signal corresponding to one of said locations on said direction pad; and
    a computer-controlled actuator coupled to said direction pad, said actuator outputting a linear force directly on said direction pad, wherein said linear force is provided along a z-axis approximately perpendicularly to a plane of a top surface of said direction pad.

23. A control device as recited in claim 22 further comprising a local microprocessor separate from said host computer, said microprocessor receiving force information from said host computer and providing control signals based on said force information to control said actuator.

24. A control device as recited in claim 22 further comprising a sensor that detects when said locations of said direction pad have been contacted by said user.

25. A control device as recited in claim 24 wherein said sensor includes a plurality of contact switches.

26. A control device as recited in claim 22 wherein said direction pad is capable of being contacted by said user in four different locations, each location providing a different directional signal to said host computer.

27. A control device as recited in claim 22 wherein said actuator outputs a vibration or pulse tactile sensation on said direction pad.

28. A control device as recited in claim 22 further comprising a sensor for detecting motion or position of said direction pad approximately perpendicularly to a top surface of said direction pad, wherein an input signal based on said detected motion or position is sent to said host computer.

29. A control device as recited in claim 22 wherein said computer displays a graphical environment which with said user interacts using said control device, and wherein said direction pad is moved to different positions on an axis approximately perpendicular to a top surface of said direction pad, said different positions based on a desired 3-D elevation of an object or area displayed in said graphical environment.

30. A control device as recited in claim 22 wherein said direction pad is caused to move to a lower position when a user-controlled graphical object is moved over a selectable graphical object displayed in a graphical environment implemented by said host computer.

31. A control device as recited in claim 22 wherein said host computer implements and displays a graphical environment, and wherein said direction pad controls a cursor in said graphical environment.

32. A control device as recited in claim 31 wherein a menu is displayed in said graphical environment, wherein when said cursor is moved between menu elements in said menu, a pulse is output on said direction pad, said pulse causing said direction pad to move along said z-axis.

33. A control device as recited in claim 31 wherein an icon is displayed in said graphical environment, wherein when said cursor is moved over said icon, a pulse is output on said direction pad, said pulse causing said direction pad to move along said z-axis.

34. A control device as recited in claim 31 wherein a web page is displayed in said graphical environment and a hyperlink is displayed on said web page, wherein when said cursor is moved over said hyperlink, a pulse is output on said direction pad, said pulse causing said direction pad to move along said z-axis.

35. A control device as recited in claim 22 wherein said device is a gamepad controller.

36. A control device as recited in claim 22 wherein said device is a mouse.

37. A control device as recited in claim 22 wherein said device is a remote control device for controlling functions of an electronic device or appliance.

38. A control device as recited in claim 22 wherein said device is a handheld device operated with at least one hand of a user.

39. A control device as recited in claim 22 wherein said force on said direction pad causes said direction pad to vibrate along said z-axis with respect to said housing.

40. A method for providing haptic feedback to a direction pad of an interface device, said interface device coupled to a host processor implementing a graphical environment, the method comprising:
    providing a housing;
    providing at least one sensor operative to sense manipulation of a direction pad provided on said housing by a user, said direction pad including a plurality of locations, wherein said manipulation includes the pressing of at least one of said locations on said direction pad by said user, wherein said at least one sensor provides a different sensor signal for each of said pressed locations; and
    providing an actuator coupled to said housing, said actuator receiving control signals derived from force information from said host processor, wherein said force information causes said actuator to output a force on said direction pad to cause said direction pad to move with respect to said housing, said force being correlated with an interaction occurring in said graphical environment between a user-controlled graphical object or entity and a different graphical object.

41. A method as recited in claim 40 wherein said force output on said direction pad is a linear force approximately perpendicular to a top surface of said direction pad.

42. A method as recited in claim 41 wherein said direction pad includes four locations, each location spaced about a center point ninety degrees from adjacent locations.

43. A method as recited in claim 42 wherein each of said locations is coupled to an associated actuator for providing a force on said associated location.

44. A method as recited in claim 41 wherein said direction pad is moveable along an axis approximately perpendicular to a top surface of said direction pad, wherein said movement along said axis is sensed and information representative of said movement is sent to said host microprocessor.

45. A method as recited in claim 40 wherein a local microprocessor separate from said host processor receives said force information from said host processor and causes said control signals to be sent to said actuator.

46. A method as recited in claim 40 wherein said interaction occurring in said graphical environment includes a collision between said user-controlled graphical object or entity and said different graphical object.

47. A method as recited in claim 40 wherein said interaction occurring in said graphical environment includes a selection of said different graphical object by said user-controlled graphical object or entity, wherein said different graphical object is one of an icon, a window, and a menu item.

48. A method as recited in claim 40 wherein said direction pad is moveable along an axis approximately perpendicular to a top surface of said direction pad, wherein said movement along said axis is sensed and information representative of said movement is sent to said host microprocessor.

49. A tactile feedback control device for inputting control signals to a computer and for outputting forces to a user of the control device, the control device comprising:

a housing, said housing capable of being held and operated by a user in one or more hands of said user;

a direction pad which is capable of being contacted by said user in one or more of a plurality of different locations to provide signals to said host computer corresponding to said locations contacted, wherein each of said signals corresponds to one of said locations on said direction pad; and a computer-controlled actuator coupled to said member, said actuator outputting a force on said member to cause said member to move with respect to said housing such that said user contacting any of said plurality of different locations can feel said force.

50. A control device as recited in claim 49 wherein said direction pad provides a plurality of location signals to said host computer.

51. A control device as recited in claim 50 wherein each of said locations on said direction pad is an extension of said direction pad, said extensions being part of said direction pad, wherein said direction pad tilts approximately about a pivot point when said user presses one of said extensions.

52. A control device as recited in claim 50 wherein said direction pad is capable of being contacted by said user in four different locations, each location providing a different directional signal to said host computer.

53. A control device as recited in claim 50 further comprising a sensor for detecting motion or position of said direction pad approximately perpendicularly to a top surface of said direction pad, wherein an input signal based on said detected motion or position is sent to said computer.

54. A control device as recited in claim 49 further comprising a sensor that detects when said locations have been contacted by said user.

55. A control device as recited in claim 54 wherein said sensor includes a plurality of contact switches, and further comprising an elastometric layer positioned under said direction pad, said elastomeric layer providing conductive portions to engage said contact switches.

56. A control device as recited in claim 49 wherein said force moves said direction pad approximately perpendicularly to a plane of a top surface of said direction pad.

57. A control device as recited in claim 56 wherein said actuator is a linear actuator that provides an output force in a linear degree of freedom.

58. A control device as recited in claim 49 wherein said actuator includes one of a voice coil actuator and a piezoelectric actuator.

59. A control device as recited in claim 49 further comprising a computer-controlled housing actuator that outputs a force on said housing of said control device independently of said actuator outputting said force on said direction pad.

60. A control device as recited in claim 49 wherein said movement of said direction pad caused by said force with respect of said housing is just large enough to be able to convey a vibration to said user contacting one or more of said locations on said direction pad.

\* \* \* \* \*